Patented Sept. 7, 1937

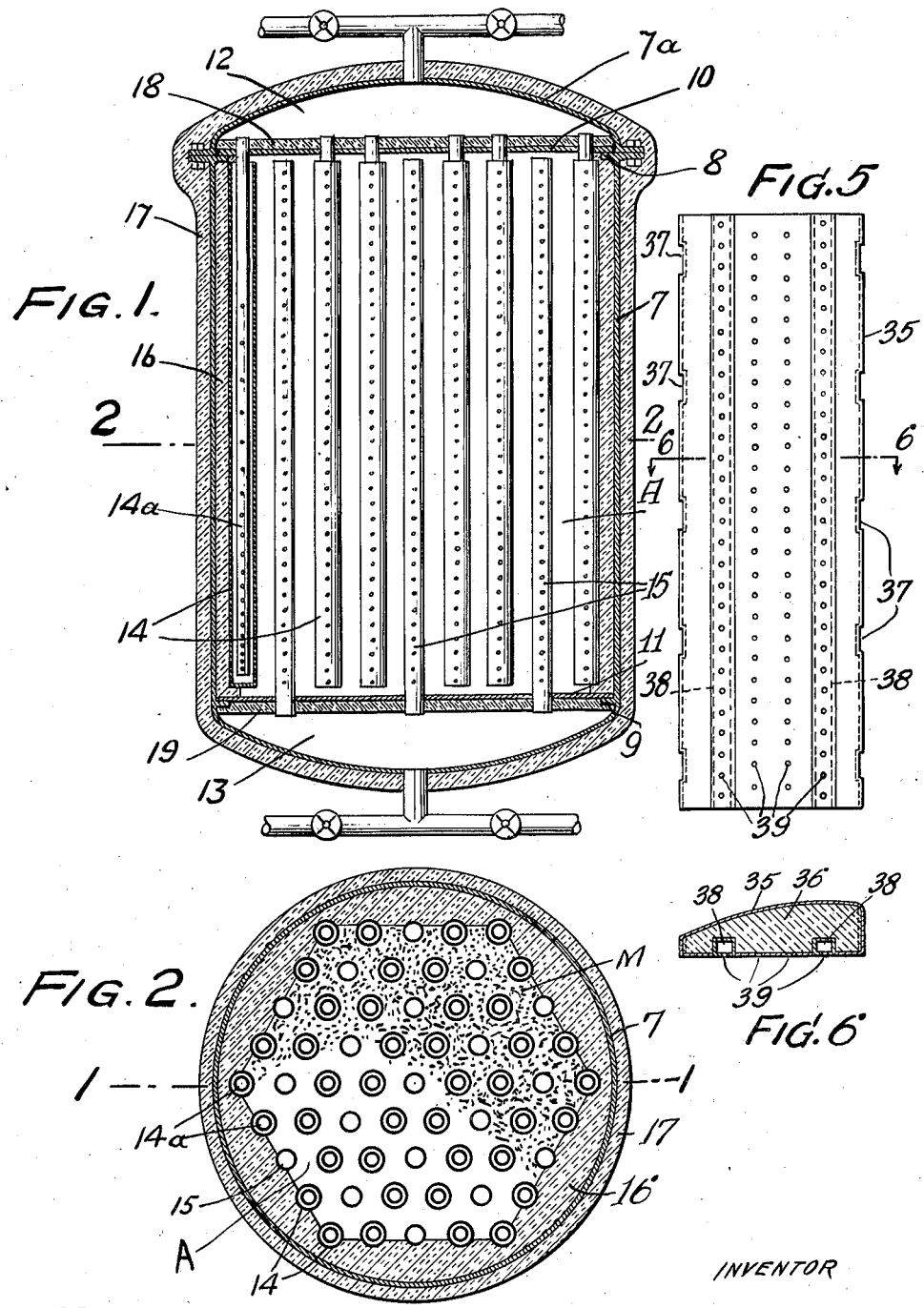

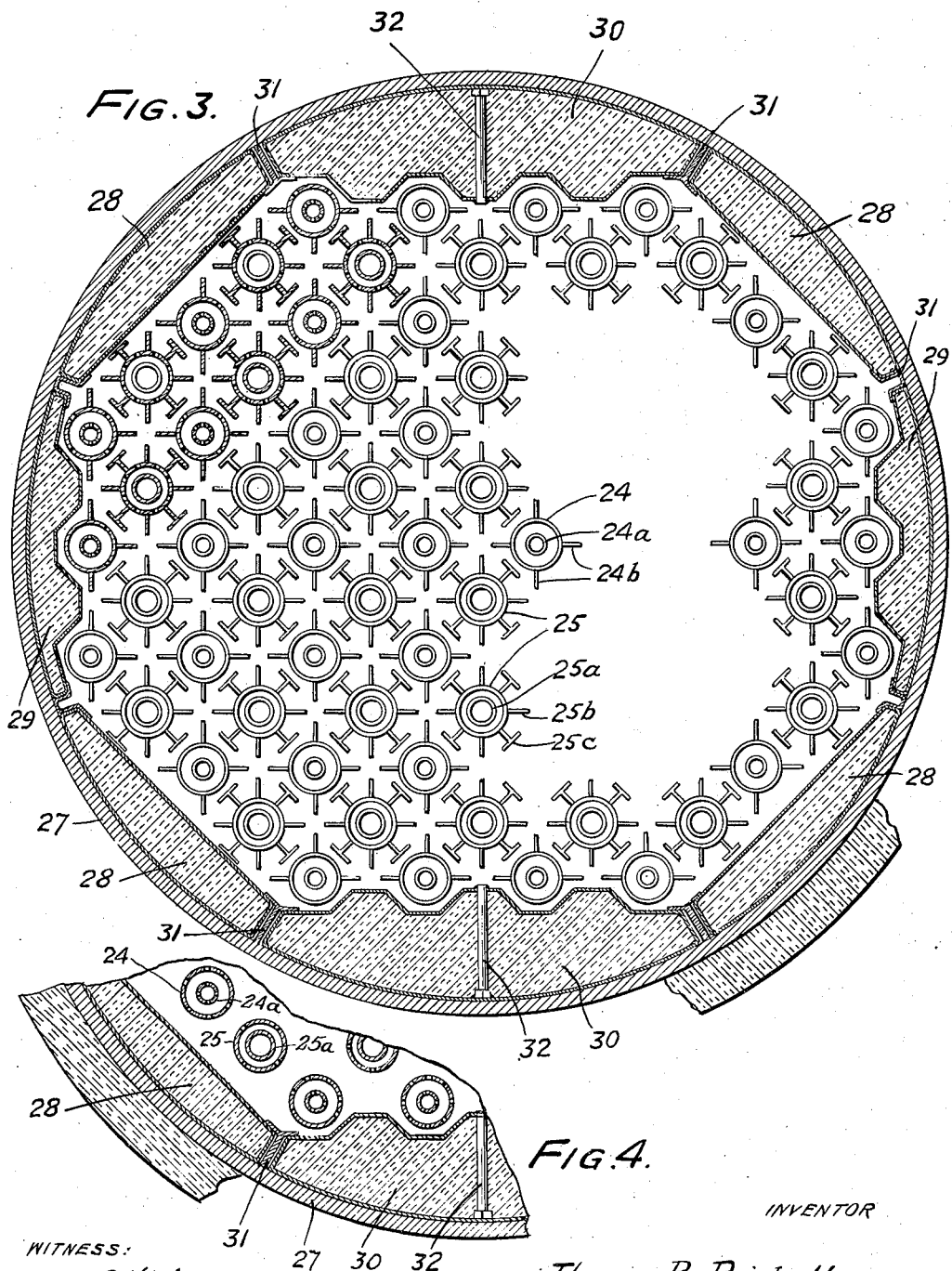

2,092,017

UNITED STATES PATENT OFFICE 2,092,017

APPARATUS FOR CONTROLLING CHEMICAL REACTIONS

Thomas B. Prickett, Woodbury, N. J., assignor to Houdry Process Corporation, Dover, Del., a corporation of Delaware Application February 1, 1935, Serial No. 4,505

15 Claims. (Cl. 23—288)

This invention relates to converters for effecting chemical reactions, either exothermic or endothermic, in the presence of contact masses which assist, promote or induce the reactions. More particularly it involves converters having perforated conduits embedded in the contact mass for distributing the reactants within the mass and/or for removing the products of the reactions from within the mass. In certain respects it may be considered to include improvements upon or further developments of the invention disclosed in the copending application of James W. Harrison, Ser. No. 712,203 filed Feb. 20, 1934 entitled "Reaction chambers for contact masses" which issued on March 5, 1935 as Patent No. 1,992,946.

Among the objects of the invention are to reduce heat losses through the converter wall, to avoid external heating or cooling of the converter wall, to protect the converter shell against high temperatures, to maintain the marginal portion of the contact mass within the temperature range of the reaction, to proportion the distribution of reactants and/or the venting of products to such smaller or irregular volumes of the mass as may be produced in the converter, and in general to improve prior arrangements in the interest of more efficient and satisfactory operation.

In converters arranged for parallel flow of fluids through the mass between perforated inlet and outlet conduits symmetrically disposed within the reaction chamber, distribution of flow of fluids should be in proportion to the quantities of the contact mass involved so as to effect uniformity of operation throughout the mass. This is essential during a transforming operation to insure a good product and a high yield and it is equally essential during a regenerating operation in order that the entire mass in all cross sectional areas thereof may be properly regenerated or reactivated during the same time period. However it is impossible to have identical amounts of catalyst or contact mass for each conduit or tube, or identical conditions of fluid movement for all parts of the mass. The chosen pattern or arrangement of conduits to be embedded in the contact mass will seldom if ever, match the internal contour of a conventional container and the use of space occupying or filler pieces or "dummies" to improve this situation will still not give an equal volume of contact mass per conduit around all of the conduits. Hence in the marginal portion there will be conduits surrounded, or rather partly surrounded, by ½, ¾ or other fractional quantities of the mass as compared with the normal amount of the mass about most of the conduits. I designate such conduits as "fractional flow conduits" and the invention contemplates supplying to such conduits only the proper proportional parts of the flow for a normal tube or conduit. Thus a conduit surrounded by only ½ the normal amount of contact material would receive only ½ the normal quantity of fluid, etc., thereby insuring for all practical purposes, uniformity of operation and of operating conditions throughout the converter. In other words each unit of mass is to receive a unit of flow.

The fractional flow conduits may be partly embedded in the filler material or "dummies", may be wholly outside the same, or may be mounted wholly within the "dummies". The latter entirely enclose the internal wall of the converter and comprise or contain heat insulating material. Thus they protect the converter shell or wall from high reaction temperatures and at the same time check heavy heat losses to the metal wall with possible impairment of the reaction. The use of insulating material on the outside of the converter wall in addition to the fillers or "dummies" on the inside also makes it unnecessary to send a heat exchange medium in contact with the converter wall for heating or cooling the latter. The filler material may be applied like plaster or cement after the outer row of conduits is in place, or it may comprise elements which are preformed and precured and then assembled in the converter before the conduits are mounted. The preformed elements may be cast of heat insulating material alone or they may comprise an outer shell of suitable sheet material, such as metal, which serves as a form and which is retained as a protecting cover after the filling material has been cured as a solid mass.

In order to illustrate the invention concrete embodiments thereof are shown in the accompanying drawings in which:

Fig. 1 is a vertical sectional view, substantially on the line 1—1 of Fig. 2, of a converter showing certain parts in elevation, the contact mass in the reaction chamber being omitted for the sake of clearness;

Fig. 2 is a horizontal sectional view on the line 2—2 of Fig. 1, but indicating a contact mass in place;

Fig. 3 is a horizontal sectional view on an enlarged scale showing a modified arrangement, the contact mass and certain of the conduits being omitted for clearness;

Fig. 4 is a fragmentary sectional view of a portion of the converter shown in Fig. 3, the conduits being shown without fins;

Fig. 5 is a side elevational view of a sectional filler member or "dummy"; and

Fig. 6 is a transverse sectional view on the line 6—6 of Fig. 5.

The converter shown in Figs. 1 and 2 comprises an outer casing or shell 7 having a cover portion 7a and provided on its interior adjacent its upper and lower ends with internal flanges 8 and 9 on which rest upper and lower partitions or tube sheets 10 and 11, respectively, which divide the interior of the converter into a large central reaction chamber A and upper and lower end or manifolding chambers 12 and 13, respectively. Mounted on upper tube sheet 10 and extending into reaction chamber A in symmetrical arrangement, as indicated in Fig. 2, is a series of fluid distributing elements 14 connecting reaction chamber A with upper manifolding chamber 12. Similarly, a series of fluid outlet elements 15 are mounted on lower tube sheet 11 to extend into reaction chamber A in symmetrical arrangement with each other and with distributing elements 14 to connect the reaction chamber to lower manifolding chamber 13. With this arrangement, it is obvious that fluids admitted to manifolding chamber 12 are distributed by the perforated elements 14 within and throughout a contact mass such as M (Fig. 2), and that the reaction products are removed uniformly from a multiplicity of points within the mass after a parallel flow movement through the latter. The distributing elements 14, as shown, comprise outer perforated conduits and smaller supply conduits 14a extending therewithin in spaced telescoping or nested arrangement (see the sectioned conduit 14 at the extreme left side of Fig. 1). Only the inner supply conduits 14a are connected to upper manifolding chamber 12, as indicated. The perforated conduit series 15 may consist of single pipes, as shown.

Reaction chamber A is restricted by a layer 16 composed wholly or partly of heat insulating material covering the inner wall of casing or shell 7 and interposed between the latter and the outer row of conduit elements 14 and 15, as clearly indicated in Fig. 2. This layer may be advantageously formed by first mounting the outer row of conduits 14 and 15 in place and then applying the filling or insulating material like plaster or cement to fill the space between the conduits and directly against those portions of the same which face the converter wall. If necessary or desirable, the inner surface of insulating layer 16, which is exposed to the fluids admitted to reaction chamber A and to the contact material, may be suitably protected as by coating applied thereto or by sheet metal plates (not shown) mounted between conduits 14 and 15 and suitably secured in place by welding or otherwise. In accordance with the usual practice, a layer of heat insulating material 17 is also applied to the entire exterior of the converter. In this manner, the shell of the converter is fully protected against high temperatures and abrupt changes in temperature. Tube sheets 10 and 11 may also be protected by heat insulating material, such as layers 18 and 19, respectively, applied to either or both sides thereof, as desired. In fact, the entire interior of both manifolding chambers 12 and 13 may be sheathed with heat insulating material, if desired.

Inasmuch as the conduits 14 and 15 of the aforesaid outer row are only partly surrounded by contact mass M and hence are utilized to supply reactant fluids to or remove reactant products from portions of the mass which are smaller than the portions supplied by the conduits toward the center of the reaction chamber which are entirely surrounded by the contact mass, it is essential, for the maintenance of substantially uniform reaction conditions within the converter, that such outer row of conduits provide for flow of fluid proportional to the amounts or volumes of the contact mass adjacent thereto. In the form of the invention shown in Figs. 1 and 2, this modification of the outer row of conduits to effect fractional flow is automatically taken care of by disposing filler material 16 directly against the walls of the conduits, thereby blocking certain of the perforations or ports therein, and it is apparent by an inspection of Fig. 2 that certain of the conduits in the marginal portions of the contact mass provide for various fractional parts of the normal fluid flow, such as one-third, one-half, two-thirds, etc.

In the modification shown in Figs. 3 and 4, the inner face of converter shell 27 is protected by a heat insulating layer made up of preformed and precured sections, such as 28, 29, and 30. In this modification, the sections which are mounted on diametrically opposite parts of the inner wall are identical and are given the same reference characters. These filler sections may be cast wholly of heat insulating material which, after hardening and curing so as to resist the action of fluid reactants and the contact mass, are mounted on the inner wall by clips 31 or other securing means which will permit limited relative movement, the sections being installed before the inlet and outlet conduits are assembled within the converter. If desired, the insulating sections 28, 29, and 30 may have an outer covering or casing of sheet material, such as metal, of suitable strength to serve as a form, the same being filled with the heat insulating material which preferably includes a binder so that it will harden in place. The thicker sections, such as 30, may be provided, if necessary or desirable, with tie rods 32 to maintain the opposite sides of the sheet metal form in proper relative position. In any case, one side face of the filler sections is shaped to fit the inner wall of the converter shell, while the other conforms to the pattern of conduits to be mounted within the reaction chamber, only sufficient clearance being provided to permit the conduits to be easily assembled in place. In Figs. 3 and 4, the two series of inlet and outlet conduits 24 and 25, respectively, are arranged according to a square pattern rather than in the hexagonal pattern shown in Figs. 1 and 2. Hence the inner configuration of the reaction chamber produced by insulating sections 28, 29 and 30 is generally octagonal rather than hexagonal, as shown in Fig. 2. The distributing elements 24 conform to distributing elements 14 of Figs. 1 and 2, in that they have a small inner telescoping supply conduit 24a. The outlet conduits 25, however, are of the same outer dimension as distributing conduits 24, and have therewithin inner conduits 25a for the passage of cooling or heating fluid which is kept separate and distinct from either the reactant fluids or the products of the reaction. The marginal or outermost row, made up of conduits of both series, is arranged for fractional flow of fluids substantially in proportion to the volume of the contact mass surrounding the same, but, in this instance, the flow is controlled by omitting some of the ports, rather than by blocking the same with insulating material, as was done in Figs. 1 and 2. Also, in the case of the outer row of distributing conduits 24, inner supply pipes 24a have their ports or openings proportioned to the smaller number of ports in outer conduit 24, so that there will be an even flow through a lesser number of ports, but conforming to the normal flow through the ports of the full flow elements of the same series.

Fig. 3 illustrates an arrangement designed for use with a contact mass which is a poor conductor of heat. To compensate for the low heat conductivity of the mass in the control of both endothermic or exothermic reactions, the outer conduits 24 of the distributing series have four straight fins 24b projecting into the contact mass, while the outlet conduits 25, (which have inner conduits 25a for an independent cooling or heating medium) have eight fins radiating therefrom, four of the fins such as 25b, being straight, like the fins 24b on distributing elements 24, and the remaining four fins being T-shaped as indicated at 25c and arranged to alternate with the straight fins 25b. Certain of the conduit elements of one or both series disposed in the outer row and arranged for fractional flow of fluids may have fins varying in extent or number to correspond to the variations in the volume of the contact mass adjacent thereto, including omission of fins in certain instances as indicated. Fig. 4 illustrates the arrangement when the converter of Fig. 3 is filled with a contact mass which is a reasonably good conductor of heat. In this instance, all fins are omitted on both the distributing series 24 and the outlet series 25, but the individual members making up the outer row are arranged for fractional flow.

Figs. 5 and 6 show details of an individual filler section, such as illustrated in Figs. 3 and 4, as well as a further modification in which perforated conduits are embedded within the filler piece so as not to extend beyond the outer wall thereof. The filler piece, as illustrated, comprises an outer casing 35 of sheet material, such as metal, which serves as a form and encloses the mass 36 of heat insulating material which fills the same and has preferably hardened into a solid mass. The end walls of the filler piece are recessed at intervals, as indicated at 37, to provide space for fastening members, such as the clips 31 illustrated in Figs. 3 and 4, it being understood that similar recesses in an adjacent filler section or "dummy" will give clearance for the clip and permit such movement of the filler sections or "dummies" relative to the shell of the converter as may result from temperature variations. If it is desired that certain of the conduits, either for distributing reactants or removing fluid products, be within the confines of the filler piece, this may be effected by entirely embedding the conduit within the filler member or by applying one or more bent plates 38 (Fig. 6) to the inner face of that portion of the casing which is to be remote from the wall of the converter, therewith to form the conduits. Perforations, such as 39, through the outer casing, may then be provided, certain of which communicate with the conduits formed by plates 38 and others of which serve merely as vents for the interior of the filler case to prevent distortion of the same under operating conditions.

The use of an insulating covering for the inner as well as the outer sides of the wall of the reaction chamber is highly important in the control of chemical reactions, especially when there is a sharp rise in temperature from one level to another, as for example from an endothermic reaction taking place at about 850° F. to a strongly exothermic reaction at about 1050° F. Under such conditions it is essential for satisfactory operation that little heat be lost from the reaction zone either to atmosphere or through absorption as sensible heat by the converter walls. Also since such operations are often conducted under pressure it is advantageous to keep the converter shell reasonably low in temperature on account of decrease in the inherent strength of such materials as carbon steel at temperatures much over 700° F.

With reference to the expression "fractional flow" as applied herein to certain distributing and outlet conduits, it is to be understood that this expression may indicate not only amounts less than 1 as compared to other conduits in the pattern but also to amounts greater than 1, if the disposition of the conduit and the quantity of contact mass served thereby bears such relation to the main pattern.

I claim as my invention:

1. A converter providing a reaction chamber having a contact mass therein, and a series of perforated conduits extending into said chamber and embedded in said mass in substantially symmetrical and parallel arrangement for supplying reactant fluids to said mass and/or for removing fluid products of reaction therefrom, certain of said conduits being surrounded by and serving portions of the contact mass unequal in volume to the portions of the mass served by neighboring conduits, said certain conduits having perforations providing a rate of flow of fluid differing from that of said neighboring conduits of said series according to the relative volumes of said contact mass adjacent thereto so that the amount of fluid per unit volume of contact mass passing through the portions of the contact mass adjacent each of the conduits will be substantially the same.

2. A converter providing a reaction chamber having a contact mass therein, and full flow and fractional flow perforated conduits extending into said chamber and embedded in said mass in substantially symmetrical and parallel arrangement for supplying reactant fluids thereto and/or for removing fluid products therefrom, said fractional flow conduits comprising at least a portion of the conduits mounted nearest to the converter shell and being at least partially surrounded by volumes of contact mass unequal to the volumes of mass surrounding said full flow conduits, each conduit providing for movement of fluid proportional to the volume of the contact mass adjacent thereto so that the amounts of fluids handled per unit volume of contact mass will be substantially uniform through all portions of the contact mass, through portions nearest the converter shell as well as through portions located toward the center of the converter.

3. A converter providing a reaction chamber having a contact mass therein, two series of perforated conduits extending into said chamber in substantially symmetrical and parallel arrangement and embedded in said mass, one series of said conduits for distributing reactant fluids all through the said mass, the other of said series of conduits for removing the products of reaction from a multiplicity of points within said mass, certain of the conduits of each of said series being adjacent and serving volumes of contact mass smaller than the volumes of mass adjacent to and served by the remaining conduits and being constructed and arranged to provide only a fraction of the flow of fluid provided by said remaining conduits of each of said series respectively, said fraction of flow being proportional to the volume of the mass adjacent thereto as compared with the volume of the mass adjacent said remaining conduits so that the amount of fluids passing through contact mass adjacent each of said conduits will be substantially the same per unit volume of the mass adjacent thereto.

4. A converter providing a reaction chamber having a contact mass therein, two series of perforated conduits extending into said chamber in substantially symmetrical and parallel arrangement and embedded in said mass, one series of said conduits for distributing reactant fluids all through said mass, the other of said series of conduits for removing the products of reaction from a multiplicity of points within said mass, a number of conduits of each of said series, which are located closest to the walls of said converter being at least partially surrounded by smaller volumes of contact mass than the volumes of mass surrounding individual conduits located centrally of the chamber, said outwardly located conduits being constructed and arranged so that each provides only a fraction of the flow of fluid provided by each of the other remaining conduits of each series respectively, so that the amount of fluids per unit volume of contact mass passing through contact mass around conduits adjacent the said walls of said converter will be substantially the same as through portions of the mass disposed around said conduits located centrally of the aforesaid reaction chamber.

5. A converter providing a reaction chamber having a contact mass therein, two series of perforated conduits extending into said chamber in substantially symmetrical and parallel arrangement and embedded in said mass, one series of said conduits for distributing reactant fluids all through said mass, the other of said series of conduits for removing the products of reaction from a multiplicity of points within said mass, a number of conduits of the aforesaid one series of said inlet conduits, which are located closest to the walls of said converter being at least partially surrounded by volumes of contact mass smaller than the volumes of mass surrounding individual conduits located centrally of the chamber, said outwardly located conduits being constructed and arranged so that each provides only a fraction of the flow of fluid provided by the other remaining conduits of said inlet series so that the amount of fluids per volume of contact mass passing through contact mass around each inlet conduit will be substantially the same through contact mass adjacent the wall of the converter as through contact mass located centrally of the reaction chamber.

6. A converter providing a reaction chamber having a contact mass therein, two series of perforated conduits extending into said chamber in substantially symmetrical and parallel arrangement and embedded in said mass, one series of said conduits for distributing reactant fluids uniformly all through said mass, the other of said series of conduits for removing the products of reaction from a multiplicity of points within said mass, one of said series of said conduits having fins radiating therefrom, conduits of said one series which are closest to the shell of said converter being constructed and arranged to provide only a fraction of the flow of fluids provided by other conduits of said series which are more remotely spaced therefrom, the size of the fins on the said conduits which provide fractional flow being adjusted in relation to the size of the fins of the other conduits of said series substantially in the proportion of the fluid flow of said fractional flow finned conduits to that of the said other finned conduits, so that the heat transfer effected by fins on said fractional flow finned conduits will be to the heat transferred through fins on the said other or full flow finned conduits substantially in the same relation as the flow of fluid from or to said fractional flow finned conduits is to the flow of fluid from or to the said full flow finned conduits, so that the heat transfer which each of said finned conduits is adapted to provide will be proportional to the quantity of contact mass served thereby.

7. A converter providing a reaction chamber having a contact mass therein, a series of perforated conduits extending into said chamber and embedded in said mass in substantially symmetrical and parallel arrangement for supplying reactant fluids to said mass and/or for removing the fluid products of the reaction, certain of said conduits being adjacent and serving volumes of contact mass differing from the volumes of mass adjacent to and served by the other conduits, said certain conduits having perforations providing a rate of flow of fluid differing from that of said other conduits and proportional to the relative volumes of said contact mass adjacent each conduit, so that the amounts of fluid per unit volume of contact mass passing through contact mass adjacent each of said conduits will be substantially the same, and a layer of heat insulating material covering the wall of said chamber beyond the outermost row of said conduits.

8. A converter providing a reaction chamber having a contact mass therein, full flow and fractional flow perforated conduits extending into said chamber and embedded in said mass in substantially symmetrical and parallel relation for supplying reactant fluids thereto and/or for removing fluid products of reaction therefrom, said fractional flow conduits being those mounted nearest the converter shell and being adjacent to and serving portions of contact mass smaller in volume than the portions of mass adjacent to and served by said full flow conduits, said conduits providing a movement of fluid through the portions of contact mass adjacent to each in proportion to the volume of such portions of the mass, so that the amounts of fluids per unit volume of mass passing through the mass will be substantially the same for all portions of the bed of contact mass, through portions adjacent the converter shell as well as through portions located toward the center of the converter, and a mass of heat insulating material interposed between said fractional flow conduits and the converter shell to restrict transfer of heat to or from the latter.

9. A converter providing a reaction chamber having a contact mass therein, two series of perforated conduits extending into said chamber in substantially symmetrical and parallel arrangement and embedded in said mass, one series of said conduits for distributing reactant fluids all through said mass and the other of said series of conduits for removing the products of reaction from a multiplicity of points within said mass, each of said series of conduits having fins radiating therefrom, and a layer of heat insulating material around the inner wall of said chamber separating said contact mass from said wall, conduits of each of said series adjacent said layer of said heat insulating material providing only a fraction of the flow of fluid provided respectively by other conduits of each series which are located more remotely therefrom, the conduits which provide fractional flow having a reduced number of fins as compared with conduits located more remotely from said layer of said insulating material so that the heat transferred through fins on said fractional flow finned conduits will be related to the heat transferred by fins on the said other or full flow conduits of each series respectively substantially as the flow of fluid from or to the fractional flow conduits of each series is to the flow of fluid from or to the said full flow conduits of each series, respectively, thereby to provide that the heat transfer effected by each of said finned conduits will be in proportion to the quantity of contact mass served thereby.

10. A converter providing a reaction chamber having a contact mass therein, full flow and fractional flow perforated conduits extending into said chamber and embedded in said mass in substantially symmetrical and parallel arrangement for supplying reactant fluids thereto and/or for removing fluid products therefrom, said fractional flow conduits being those mounted nearest the converter shell and providing for movement of fluid through contact mass adjacent to each in proportion to the movement of fluid through contact mass adjacent to and served by full flow conduits, and a mass of heat insulating material interposed between said fractional flow conduits and the converter shell to restrict transfer of heat to or from the latter, said fractional flow conduits being partly embedded in said mass of heat insulating material, thereby to restrict the distribution of fluids into said contact mass or withdrawal of fluids therefrom to a fractional portion of the periphery of each of said fractional flow conduits.

11. In apparatus for effecting chemical reactions, a converter providing a reaction chamber for containing a contact mass, the shell of said converter forming at least a part of the walls of said chamber, perforated conduits extending into said chamber to be embedded in said mass for distributing reactants therethrough and/or for removing reaction products therefrom, said conduits being disposed in substantially parallel and symmetrical relation to form a pattern within said chamber, certain of the conduits forming the boundaries of said pattern being nearer said shell and adjacent and serving smaller volumes of contact mass than other conduits and means providing a layer of heat insulating material over the inner wall of said converter, between the latter and the outermost of said conduits, said insulating material being arranged so as to close a portion of the perforations in said certain of said boundary conduits thereby to proportion the flow of fluid through the contact mass immediately adjacent said partially closed conduits, so that substantially the same amount of fluid per unit volume of contact mass flows through the portions of the mass adjacent said partially closed conduits as through portions of the mass located adjacent the other conduits.

12. In apparatus for effecting chemical reactions, including a converter providing a reaction chamber, in which the shell of said converter forms at least a part of the walls of said reaction chamber, and a contact mass within said chamber, that improvement adapted to maintain conditions of operation uniform throughout each cross section of said contact mass which comprises space occupying members covering the inner face of that part of said shell forming said walls of said reaction chamber, said members being of such shape and arranged so as to provide an irregularly shaped inner surface against which the peripheral surface of said body of contact mass will fit, and a plurality of full flow and fractional flow perforated conduits extending into said reaction chamber, arranged in substantially symmetrical and approximately parallel relation, said fractional flow conduits being among those mounted adjacent said space occupying members and having volumes of contact mass adjacent thereto and served thereby unequal to the volumes of mass adjacent to and served by said full flow conduits, said conduits providing for passage of substantially uniform amounts of fluid per unit volume of the contact mass through all portions of the same.

13. A filler member having a perforated fluid conduit imbedded therein and comprising heat insulating material, said member being preformed and precured to fit the inner wall of a reaction chamber and to serve as an insulating lining therefor, the perforations in the aforesaid conduit adapted to permit passage of fluid into or from said chamber when said filler member is in place therewithin.

14. A filler member or "dummy" adapted to line a part of the inner wall of a reaction chamber and to form an insulating cover therefor, said member comprising heat insulating material preformed and precured and having a fluid conduit embedded therein, said conduit being perforated at intervals and the perforations connecting with the exterior of said member on the side opposite to that which is to engage the wall of the reaction chamber for admitting fluid to or withdrawing fluid from said chamber.

15. A filler member adapted to line the inner wall of a reaction chamber and comprising an outer casing of sheet material filled with heat insulating material, and means within said member, adjacent said outer casing, forming a fluid conduit, said casing having perforations for venting the insulating material therewithin and other perforations providing fluid communication between said conduit and the chamber, said conduit to be connected in fluid flow relationship with a space exterior to the aforesaid chamber.

THOMAS B. PRICKETT.